United States Patent [19]

Pieciak

[11] 4,156,601

[45] May 29, 1979

[54] FILTER CARTRIDGE AND METHOD OF MANUFACTURING THE FILTER CARTRIDGE

[76] Inventor: Peter P. Pieciak, 1247 E. Main St., Chicopee Falls, Mass. 01013

[21] Appl. No.: 889,628

[22] Filed: Mar. 24, 1978

[51] Int. Cl.$^2$ .......................................... B01D 46/00
[52] U.S. Cl. ........................................ 55/367; 55/491; 210/489; 210/492; 210/497 R; 210/DIG. 5
[58] Field of Search ............ 210/DIG. 5, 323 T, 435, 210/457, 459, 460, 461, 462, 483, 484, 486, 487, 488, 489, 490, 492, 497 R, 500 R, 503, 504, 505, 506, 507, 508, 509; 55/367, 369, 491, DIG. 2

[56] References Cited

U.S. PATENT DOCUMENTS

| | | | |
|---|---|---|---|
| 934,076 | 9/1909 | Kneuper | 210/484 |
| 1,755,962 | 4/1930 | Shigyo | 210/484 |
| 1,894,884 | 1/1933 | Page | 210/484 |
| 1,897,976 | 2/1933 | Birkholz | 210/484 |
| 2,557,279 | 6/1951 | Greenberg | 210/484 |
| 2,812,065 | 11/1957 | Wilson | 210/500 R |
| 2,826,265 | 3/1958 | DeWoody | 210/484 |
| 3,876,544 | 4/1975 | Fowler | 210/DIG. 5 |
| 3,980,565 | 9/1976 | Fowler | 210/DIG. 5 |

*Primary Examiner*—Frank Sever

[57] ABSTRACT

A filter cartridge for filtering fluids comprising: a cylindrical porous support tube which is permeable to the fluid to be filtered; at least one layer of boro-silicate glass filter paper being wrapped around the cylindrical support; a porous sleeve including a wall having a longitudinal slit therein to allow wrapping of the sleeve around the filter paper; and a zipper affixed to the wall which closes the slit and maintains the position of the glass filter paper without damage to the paper. Also disclosed is a method for manufacturing a filter cartridge having as a principle filtering element a boro-silicate glass paper which is very fragile and can be seriously degraded by crushing. The method comprises wrapping at least one layer of boro-silicate glass paper around a cylindrical porous support; wrapping a cylindrical porous sleeve including a wall having a longitudinal slit therein around the filter paper to secure and protect the filter paper; and closing the slit by closing a zipper attached to the wall.

17 Claims, 2 Drawing Figures

FILTER CARTRIDGE AND METHOD OF MANUFACTURING THE FILTER CARTRIDGE

BACKGROUND OF THE INVENTION:

(1) Field of the Invention

The present invention relates to a filter cartridge for filtering fluids. More specifically, the present invention relates to a filter cartridge having utility, for example, in separating oil from an oil and compressed air mixture.

(2) Description of the Prior Art

Separators which remove liquid from liquid and gas mixtures are well known in the art. Such separators typically include a container having at least one cylindrical filter cartridge disposed therein and are often used to separate oil from oil and air mixtures. The oil and air mixture flows radially inwardly through the filtering material included in the cylindrical filter cartridge. The filtering material causes the finely divided atomized particles of oil to coalesce in comparatively large droplets which will be drained off into a sump for collection. The filtered air flows radially inwardly into an axial passage and the filtered air flow axially out of the cartridge.

The material used for filtering is critical to the ability of the filter cartridge to separate the oil from the oil and air mixture. It is known that a porous boro-silicate glass filter material is particularly suited for removing oil from an oil and air mixture. However, boro-silicate glass filtering material in sheet or paper form has a low density and is extremely susceptible to being crushed during manufacture and use of the filter cartridge. The boro-silicate glass filtering paper also abrades easily. Crushing of the boro-silicate glass filtering paper results in a substantial decrease in the ability of the material to separate oil from an oil and air mixture. Thus, while it is understood in the art that the boro-silicate glass paper would perform well as one of the filtering materials included in a cylindrical filter cartridge, until the present invention, this difficult to handle paper has not been employed in commercially available filter cartridges. There exist commercially available filter cartridges which use boro-silicate glass material which is molded into the desired form by an expensive molding process. Even the molding process tends to crush the boro-silicate glass fibers to that the molded form has inconsistent filtering capabilities throughout.

It is one object of the present invention to provide a filter cartridge which is highly efficient in removing oil from an air and oil mixture.

It is another object of the invention to provide a filter cartridge that can use low density, highly crushable filter paper such as boro-silicate glass paper.

SUMMARY OF THE INVENTION

The present invention provides an improved filter cartridge employing boro-silicate glass as the principle filtering material of the cartridge. The structure of the filter cartridge allows for use of the boro-silicate glass paper without substantial crushing of the paper during manufacture or use of the filter cartridge.

The filter cartridge of a preferred embodiment of the present invention includes a cylindrical porous support which is permeable to the fluid to be filtered, at least one layer of boro-silicate glass filter paper wrapped around the cylindrical support and a porous sleeve including a wall having a longitudinal slit therein to provide for wrapping the sleeve around the filter paper without damage to the filter paper, and a zipper affixed to the wall of the sleeve to provide for closing of the slit. In accordance with the present invention a method of manufacturing a filter cartridge is provided wherein the boro-silicate glass paper is wrapped around a cylindrical porous support, a porous support sleeve which includes a wall having a slit therein is wrapped around the filter paper without damage to the filter paper and a zipper which is attached to the wall of the sleeve is closed to provide for securement of the filter paper to the cylindrical support and for protection of the filter paper from the impinging oil and air mixture.

DETAILED DESCRIPTION OF THE INVENTION

Figure 1:
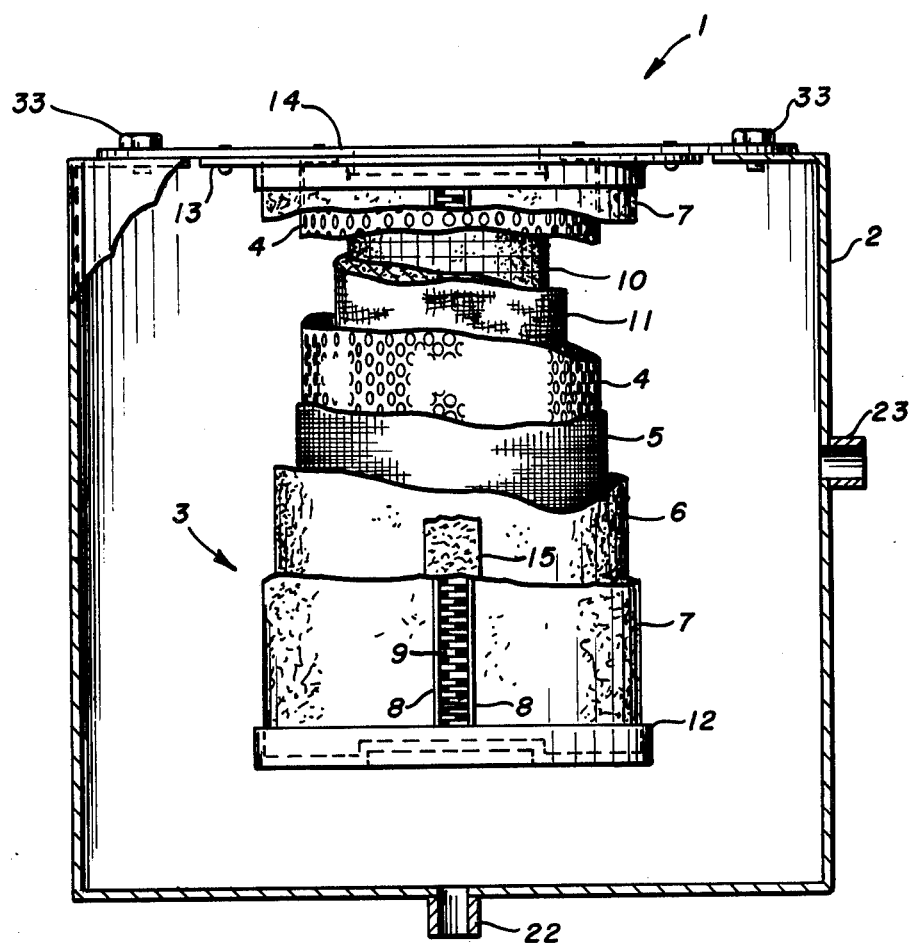
FIG. 1 shows a side view of a separator including the filter cartridge.
Figure 2:
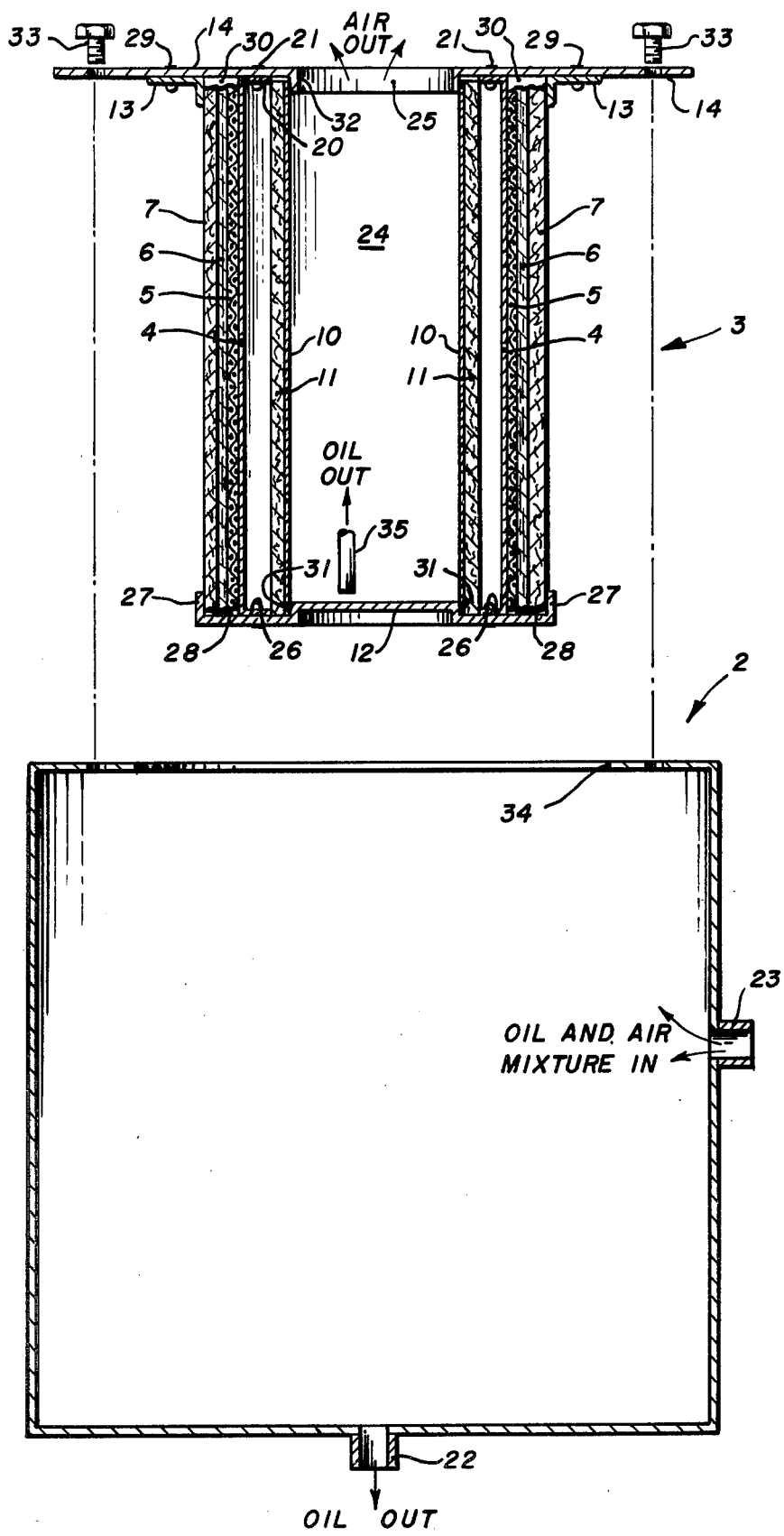
FIG. 2 shows a sectional view of the separator shown in FIG. 1.

Referring to FIGS. 1 and 2, separator 1 includes an air tank or container 2 and filter cartridge 3. Filter cartridge 3 includes a porous cylindrical support tube 4 which is preferably made out of perforated steel tubing and which includes flange 20 for securement of tube 4 to plate 14 by rivets 21. The bottom of tube 4 includes a similar flange which provides for attachment of tube 4 to bottom 12. Porous fiberglass screening 5 is wrapped around and preferably in contact with tube 4. Tube 4 and fiberglass screening 5 provide for support of boro-silicate glass 6. Fiberglass screening 5 provides a material which is softer and has smaller perforations than perforated steel tubing 4 so as to avoid crushing of the boro-silicate glass paper 6 and also prevents the glass paper from being drawn through the perforations in tube 4. It should be understood that the cylindrical support including perforated steel tube 4 and fiberglass screening 5 can be replaced with other support means which is capable of supporting boro-silicate glass paper 6 without crushing boro-silicate glass paper 6.

Boro-silicate glass paper 6 is wrapped around the porous support at least once, and preferably as many times as it is necessary to provide a thickness which will achieve the desired degree of filtering, in the intended use environment. Boro-silicate glass paper 6 has a generally low density, that is, a density of about 93 gm/m$^2$ for a paper having a thickness of about 0.5 millimeters. The paper comprises thousands of elongated fibers which are interwoven to provide a paper having very fine pores and a large internal surface area. Such paper is readily available on the open market and can be purchased from Hollingsworth and Vose Company, East Walpole, Mass., Boro-Silicate Glass Papers H-93 and H-95.

The present invention encompasses a novel and economical method in which boro-silicate paper 6 may be secured to the cylindrical porous support. Sleeve 7, when wrapped around paper 6, applied a uniform and generally small force over the entire surface area of boro-silicate glass paper 6 in order to firmly secure the paper 6 in place without crushing paper. Although the above-mentioned paper is preferred, other fiberglass papers may be used where the paper tends to be crushed. Sleeve 7 comprises a porous flexible sleeve which may be wrapped around boro-silicate glass paper 6 and includes a wall having a longitudinal slit 8 therein. Affixed to the wall of sleeve 7 is a zipper 9 for closing the slit. Subsequent to the closing thereof, zipper 9 is coated with an air impermeable material to preclude gas from passing through the zipper. The air impermeable material can be of any of a number of conventional materials such as flowable silicone coating and silicone cement. It is preferable that a strip of material 15 be made of the same material as sleeve 7 be positioned beneath zipper 9 to isolate zipper 9 from boro-silicate glass paper 6.

Sleeve 7 should be made of a material which is permeable to the fluid to be filtered and which preferably functions as a prefilter while simultaneously preventing crushing of boro-silicate glass paper 6. It is preferred that sleeve 7 be made of a polyester non-woven felt sheet of the type sold under the tradename Troy Felt by Troy Mills, Troy, N.H. Zipper 9 can be sewn into the wall of polyester non-woven felt sheet 7.

Optionally, disposed within perforated steel tube 4 is an agglomerator comprising a rigid wire cloth-like grid 10 covered with a polyester cloth-like mat 3. The agglomerator functions to prevent oil droplets which are coalesced and not drained off into sump 22 from reentering the airstream. During functioning of the separator 1, a fluid such as finely dispersed oil in compressed air is introduced under pressure into container 2 of separator 1 through inlet 23, and is forced under pressure radially inwardly through the various above-described layers which function to remove a substantial portion of oil from the air. The filtered air then proceeds upwardly through the axial passage 24 and exits through passageway 32 in plate 14. Oil from the oil air mixture coalesces and drains from container 2 through passageway 22. A small amount of oil which is not filtered by the filter cartridge 3, but which collects within cartridge 3 is suctioned out by a sump line 35 which leads outside separator 11.

As best shown in FIG. 2, bottom 12 which is preferably made out of steel has a generally round shape with an axial groove 26 therein. Axial groove 26 terminates on its outer periphery in retaining wall 27. Wall 27 functions to gently hold the porous sleeve 7, boro-silicate paper 6 and fiberglass 5 in place with respect to perforated steel tube 4 and also functions to prevent seepage of the oil and air mixture around the ends of the cartridge. To further aid in reducing seepage, void 28 and other voids in the immediate vicinity of void 28 are filled with an air impermeable cement such as silicone rubber cement. Annular shaped flange 13, which is perferably made out of steel, is fixed to plate 14 by rivets 29. Flange 13 functions in a manner similar to wall 27. An air impermeable cement fills void 30 to prevent seepage of fluid therethrough. Bottom 12 also includes inner retaining wall 31 which holds the agglomerator including grid 10 and polyester mat 3. The agglomerator is held loosely between retaining wall 31 and preforated steel tube 4. Plate 14 includes downwardly depending lip 32 which functions in a manner similar to retaining wall 31.

Filter cartridge 3 is secured within container 2 by dropping filter cartridge 3 downwardly through cartridge hole 34 in the top of container 2. An air impermeable cement is placed between container 2 and support plate 14 and bolts 33 are secured in place to provide for a sealed cartridge 3 with respect to container 2.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A filter cartridge for filtering fluids comprising:
   (a) a cylindrical support means which is permeable to the fluid to be filtered;
   (b) at least one layer of filter paper which is wrapped around the cylindrical support means, the filter paper comprising low density, highly crushable porous glass paper, said filter paper being supported on the cylindrical support means;
   (c) cylindrical porous sleeve means including a wall having a longitudinal slit therein, said sleeve means being flexible and capable of being wrapped around and providing external support for the filter paper; and
   (d) zipper means for closing the slit in said sleeve means, said zipper means extending the length of said longitudinal slit.

2. A filter cartridge according to claim 1 wherein said support means comprises a preforated steel tube having radially inwardly projecting flanges at each end thereof and further including a top plate, and a bottom defining a retaining wall at its outer periphery, one flange of the preforated steel tube being affixed to the bottom at a position spaced from said retaining wall and wherein said filter paper is secured between said retaining wall and said preforated steel tube.

3. A filter cartridge according to claim 2 wherein said plate includes a downwardly depending flange and the other flange of the preforated steel tube is affixed to the top plate at a position spaced from said downwardly depending flange and wherein the filter paper is secured between the downwardly depending flange and the preforated steel tube.

4. A cartridge according to claim 3 wherein said filter paper comprises a plurality of layers of boro-silicate glass paper.

5. A filter cartridge according to claim 2 wherein said one flange of the perforated steel tube is affixed to the bottom by means of a plurality of rivets.

6. A filter cartridge according to claim 3 wherein said flanges of the perforated steel tube are affixed to the top plate and bottom by a plurality of rivets.

7. A cartridge according to claim 1 wherein said filter paper comprises boro-silicate glass paper.

8. A cartridge according to claim 7 wherein said means for closing the slit comprises a zipper attached to the wall of said sleeve means.

9. A cartridge according to claim 8 wherein said support means comprises a perforated steel tube which has wrapped around it at least one layer of fiberglass screening.

10. A cartridge according to claim 6 and further including an agglomerator comprising a polyester cloth-like mat wrapped around a wire grid, said agglomerator positioned within said perforated steel tube.

11. A filter cartridge according to claim 10 wherein said top plate includes a downwardly depending lip to define an air flow passage, said lip retaining the agglomerator between the lip and the perforated steel tube.

12. A filter cartridge according to claim 11 wherein said bottom includes an annular groove which defines an inner retaining wall, said retaining wall securing said agglomerator between the retaining wall and the preforated steel tube.

13. A cartridge according to claim 12 wherein said sleeve means comprises a polyester non-woven felt sheet.

14. A cartridge according to claim 13 wherein a strip of polyester non-woven felt is placed between the zipper and the boro-silicate glass paper.

15. A cartridge according to claim 14 wherein said felt sheet functions as a prefilter for the cartridge.

16. A filter cartridge according to claim 1 and further including a strip of porous material placed between said zipper means and the filter paper.

17. A cartridge according to claim 16 wherein said filter paper comprises a plurality of layers of boro-silicate glass paper.

* * * * *

UNITED STATES PATENT AND TRADEMARK OFFICE
CERTIFICATE OF CORRECTION

PATENT NO. : 4,156,601
DATED : May 26, 1979
INVENTOR(S) : Peter P. Pieciak

It is certified that error appears in the above-identified patent and that said Letters Patent are hereby corrected as shown below:

Column 2, line 62, after "paper" (second (occurrence) insert --6--.

Column 3, line 36, change "11" to --1--.

Column 4, line 56 (claim 10, line 1), change "6" to --9--.

Signed and Sealed this

Sixteenth Day of October 1979

[SEAL]

Attest:

RUTH C. MASON
Attesting Officer

LUTRELLE F. PARKER
Acting Commissioner of Patents and Trademarks